United States Patent
Morino

(10) Patent No.: US 8,693,176 B2
(45) Date of Patent: Apr. 8, 2014

(54) SMART DRAIN HOLE

(75) Inventor: Takayuki Morino, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 225 days.

(21) Appl. No.: 13/406,836

(22) Filed: Feb. 28, 2012

(65) Prior Publication Data

US 2013/0222988 A1   Aug. 29, 2013

(51) Int. Cl.
*G06F 1/16*   (2006.01)

(52) U.S. Cl.
USPC ..................... 361/679.08; 220/601

(58) Field of Classification Search
USPC ............... 361/679.08; 220/601; 137/1
See application file for complete search history.

(56) References Cited

U.S. PATENT DOCUMENTS

| | | | |
|---|---|---|---|
| 6,398,436 B1 * | 6/2002 | Chao | 400/472 |
| 6,610,944 B2 | 8/2003 | Lee et al. | |
| 6,628,507 B2 * | 9/2003 | Hsu et al. | 361/679.08 |
| 6,716,518 B2 * | 4/2004 | Chao et al. | 428/308.4 |
| 6,717,046 B2 * | 4/2004 | Yanagisawa | 174/17 VA |
| 6,803,865 B2 * | 10/2004 | DeLuga | 341/22 |
| 7,385,808 B2 * | 6/2008 | Hamada et al. | 361/679.09 |
| 7,511,956 B2 * | 3/2009 | Tomioka et al. | 361/697 |
| 7,535,699 B2 * | 5/2009 | Hamada et al. | 361/679.08 |
| 7,619,880 B2 * | 11/2009 | Liang et al. | 361/679.08 |
| 7,838,784 B2 * | 11/2010 | Arisaka et al. | 200/302.1 |
| 7,990,693 B2 * | 8/2011 | Nakajima | 361/679.09 |
| 8,199,491 B2 * | 6/2012 | Uchiyama et al. | 361/679.55 |
| 2003/0179540 A1 * | 9/2003 | Suda | 361/680 |
| 2008/0304214 A1 * | 12/2008 | Nakajima | 361/680 |
| 2012/0224315 A1 * | 9/2012 | Mizoguchi et al. | 361/679.09 |
| 2012/0306752 A1 * | 12/2012 | Hosoya et al. | 345/168 |

FOREIGN PATENT DOCUMENTS

JP   2009-169569 A   7/2009

* cited by examiner

*Primary Examiner* — Lisa Lea Edmonds
(74) *Attorney, Agent, or Firm* — Shimokaji & Assoc., PC

(57) ABSTRACT

A drainage system is provided for draining liquid accidentally spilled on a casing having a plurality of pushbuttons on a surface of the casing. The drainage system for a pushbutton casing may comprise a liquid collecting receptacle, a counter-bore, and a drainage exit. The counter-bore may have a sidewall. The liquid collecting receptacle may be operatively interfacing the casing. The drainage exit may be disposed on the sidewall of the counter-bore. An end opening of the counter-bore may be in connection with a drainage exit. The end opening of the counter-bore may be disposed to allow liquid entering the drainage exit out of the end opening of the counter-bore.

20 Claims, 4 Drawing Sheets

SMART DRAIN HOLE

BACKGROUND OF THE INVENTION

The present invention relates generally to computer peripherals and, more specifically, to a computer system having a smart drain hole.

In recent years, various personal computers have evolved from transportable suitcase style computers, to popular laptops or notebooks due to their affordable prices. Many features have been added to electronic devices, such as portable telephones and personal computers to attract more users More recently, with the increasing popularity of wireless networks at individual homes and restaurants, people are using their laptop computers to either surf the internet or work while also consuming beverages. In these types of environments, people may have wet fingers or may spill their coffee, tea, or soft drinks on their computers. If there is no water drainage system for computers, liquid may damage the circuit boards of the electronic devices and the operating functions of the electronic device may be impaired.

Therefore, it can be seen that there is a need for apparatus and methods for a drainage system disposed around touchpads or keyboards of electronic devices.

SUMMARY

In one aspect, a drainage system for a pushbutton casing comprises a liquid collecting receptacle operatively interfacing the pushbutton casing; a counter-bore having a sidewall; and a drainage exit disposed on the sidewall of the counter-bore, wherein an end opening of the counter-bore is in connection with a drainage exit, the end opening of the counter-bore is disposed to allow liquid entering the drainage exit out of the end opening of the counter-bore.

In another aspect, an electronic computing device comprises a casing having a plurality of pushbuttons on a surface of the casing; and a drainage system comprising: a counter-bore having a sidewall; and a drainage exit disposed on the sidewall of the counter-bore.

In a further aspect, a method for draining liquid permeated between a plurality of pushbuttons on a surface of a casing comprises collecting liquid that has permeated between the pushbuttons on a surface of the casing; and directing the collected liquid from a liquid collecting receptacle into a drainage exit; wherein the drainage exit is disposed on a sidewall of a counter-bore.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide methods and systems for draining liquid on a casing having a plurality of pushbuttons. More specifically, exemplary embodiments of an electronic apparatus enable the liquid that permeates between the pushbuttons on a surface of the casing to flow to a drainage exit, thereby preventing the liquid from contacting circuit boards of the electronic apparatus. According to exemplary embodiments, a drainage system provides a liquid collecting receptacle which is adapted to receive liquid from an area around pushbuttons. The drainage system may further include a counter-bore having a plurality of side walls. The drainage exit may be disposed on the sidewall of the counter-bore. In exemplary embodiments, the casing may be an enclosure for a notebook computer and the pushbuttons may be a keyboard or a touchpad of the notebook computer.

Figure 1:
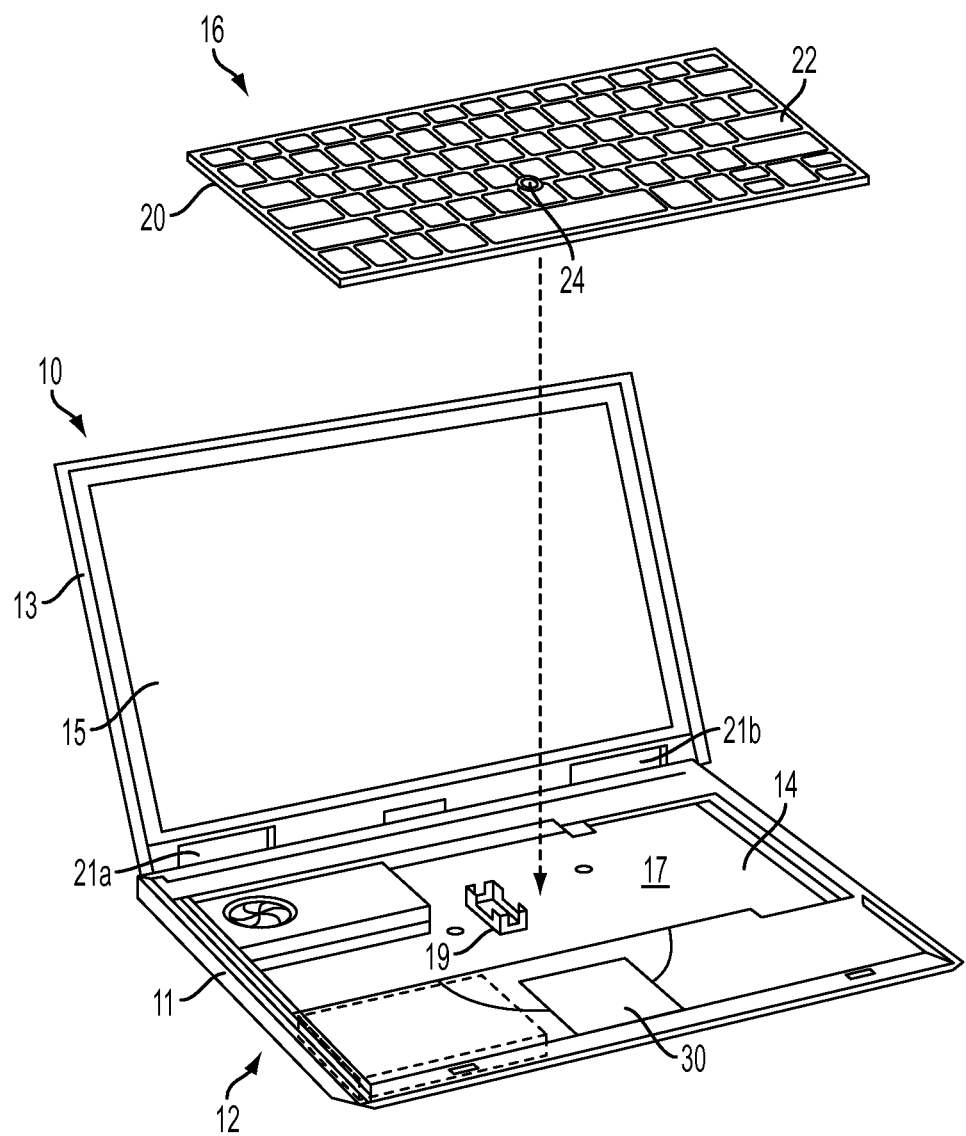
FIG. 1 is an exploded perspective view of a notebook PC according to an exemplary embodiment.

FIG. 1 is an exploded perspective view of an exemplary embodiment of a computing system which is capable of receiving, processing, and outputting data, such as a notebook PC 10. The notebook PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C.

The notebook PC 10 may have a liquid crystal display (LCD) 15 in a display casing 13. A bottom case 11 may have a bottom wall 12 and a recessed portion 14 opposing the bottom wall 12. The bottom case 11 may further accommodate system devices, such as a printed circuit board (PCB) 17. A keyboard unit 16 may be adapted for installation in the notebook PC 10. The keyboard unit 16 may be attached to the bottom case 11 so as to cover the recessed portion 14 of the bottom case 11. The bottom case 11 and the display casing 13 may be openably coupled to each other via hinge portions 21a and 21b.

Still referring to FIG. 1, the keyboard unit 16 may comprise a keyboard body 20 which may include a top face 22. The keyboard unit 16 may be electrically connected to a terminal part 19 of the printed circuit board 17.

The keyboard 16 may further include a pointing stick 24, which is used for moving a mouse pointer with an object, such as an index finger. The notebook PC 10 may further include an input device adapted to send data to the notebook PC 10 in order to perform an action in the notebook PC 10. The input device may be a flat touchpad 30, for example.

Figure 2:
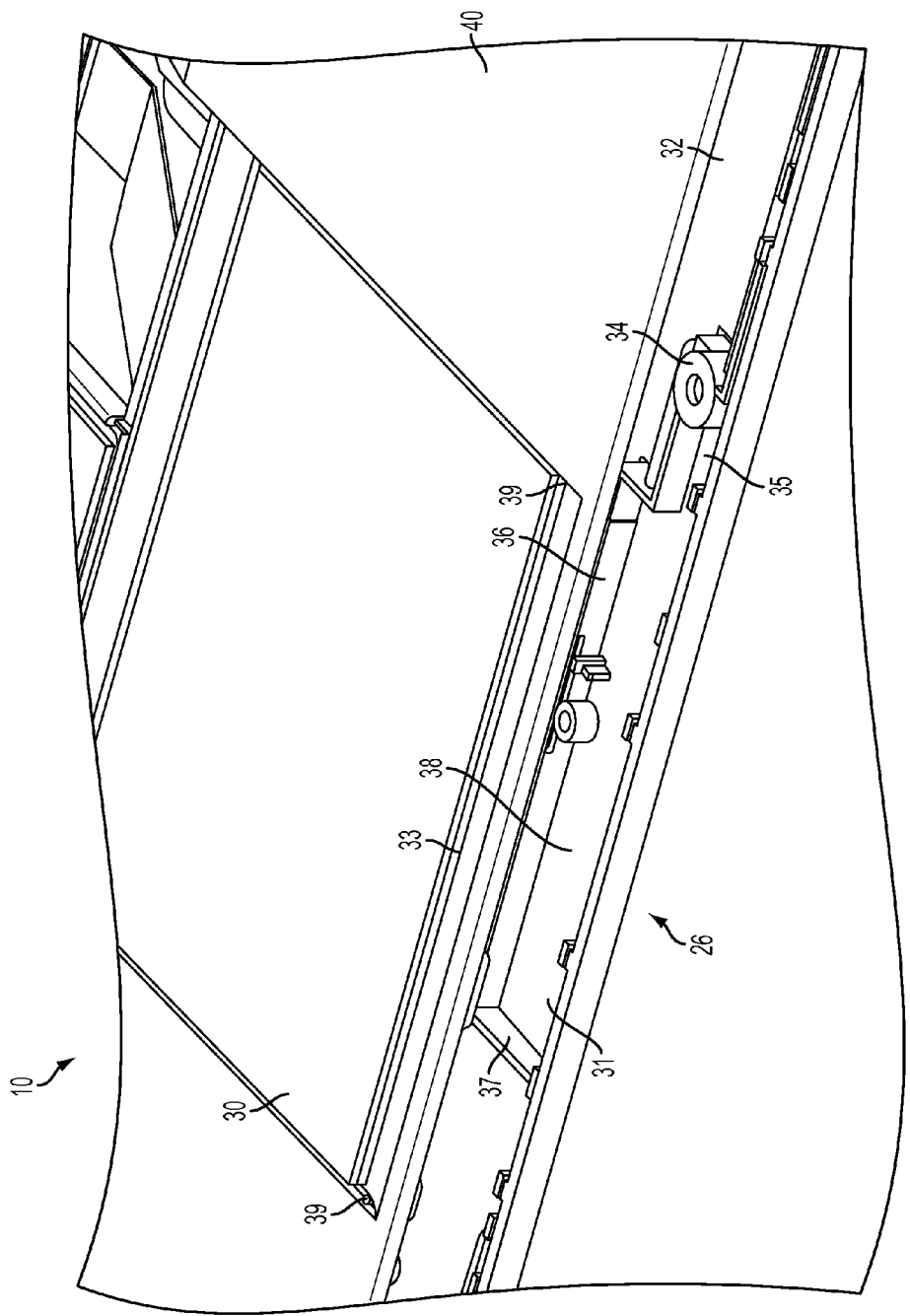
FIG. 2 is a detailed three dimensional view of a notebook PC illustrating a drainage system under a touchpad according to an exemplary embodiment.

Referring to FIG. 2, an exemplary embodiment of a notebook PC 10 may further include a drainage system 26. The drainage system 26 may be situated under the flat touchpad 30 of the notebook PC 10, for example. The drainage system 26 may have a liquid collecting receptacle 31 which operatively interfaces the bottom case 11, also known as a pushbutton casing. The drainage system 26 may further include a counter-bore 34 which may be used to receive a fastener. The bottom case 11 may include a palm rest 40. The liquid collecting receptacle 31 may be adapted to receive liquid from an area around pushbuttons, such as the touchpad 30, for example. In another exemplary embodiment, when the liquid collecting receptacle 31 is disposed and situated on a part of a keyboard supporting plate (not shown) under the keyboard unit 16, the liquid that permeates between the pushbuttons, then flows over a keyboard base plate, and goes into the liquid collecting receptacle 31.

The drainage system 26 may further include a bottom 38 and partition members 36 and 37 which may be disposed to operably interface an electronic circuit, such as the printed circuit board 17 and the liquid collecting receptacle 31. The partition member 36 may be the same as or even longer than a lower edge 33 of the touchpad 30 so that liquid that spills around the touchpad 30 may drain to the liquid collecting receptacle 31. The partition member 36 may be longer than the partition member 37 in such a way that the drainage system may be an elongated channel 35. The width of a channel 35 to the counter-bore 34 is shorter than the partition member 37 in such a way that the collected liquid may be directed towards the counter-bore 34.

Figure 3:
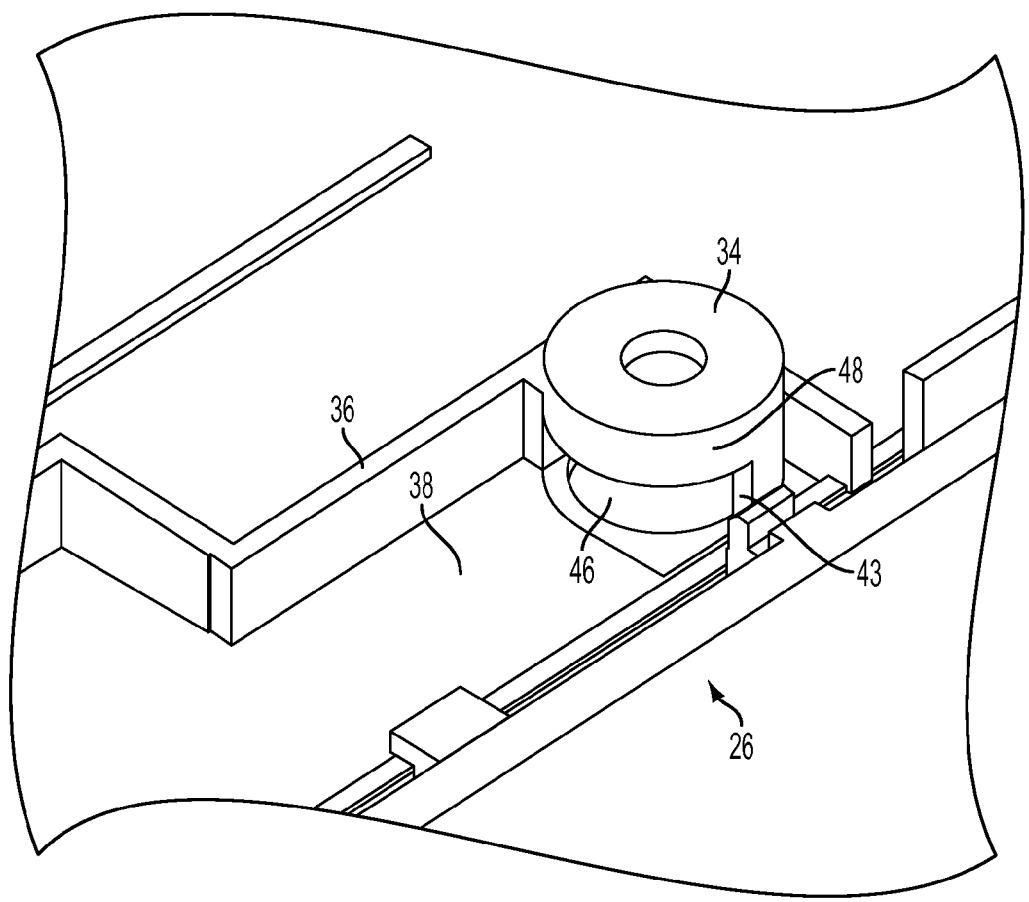
FIG. 3 is a detailed perspective view of a notebook PC illustrating a drainage exit on a sidewall of a counter-bore according to an exemplary embodiment.

As shown in FIG. 3, the drainage system 26 may further include a drainage exit 46 on a side wall 48 of the counter-bore 34. The counter-bore 34 may be a threaded counter-bore adapted to receive a fastener, such as a screw (not shown), for example. The screw may be used to connect the palm rest 40 (see FIG. 2) to the drainage system 26 which, in turn is adapted to be installed in the bottom case 11. The side wall 48 of the counter-bore 34 may be cylindrical. The drainage exit 46 may be shaped by cutting out a portion of the wall thickness of the side wall 48. The height of the drainage exit 46 may be shorter than the height of the counter-bore 34 so that a tunnel 43 may be formed extending from an outer surface to an inner surface of the counter-bore 34.

Still referring to FIG. 3, in operation, when liquid is accidentally spilled around the touchpad 30, liquid may flow to the lower edge 33 of the touchpad 30 and go into a thin clearance gap 39 between the touchpad 30 and the palm rest 40 which surrounds the touchpad. The liquid collecting receptacle 31 may collect liquid that has permeated around the touchpad 30. The collected liquid may move substantially horizontally from a liquid collecting receptacle 31 into a drainage exit 46.

Figure 4:
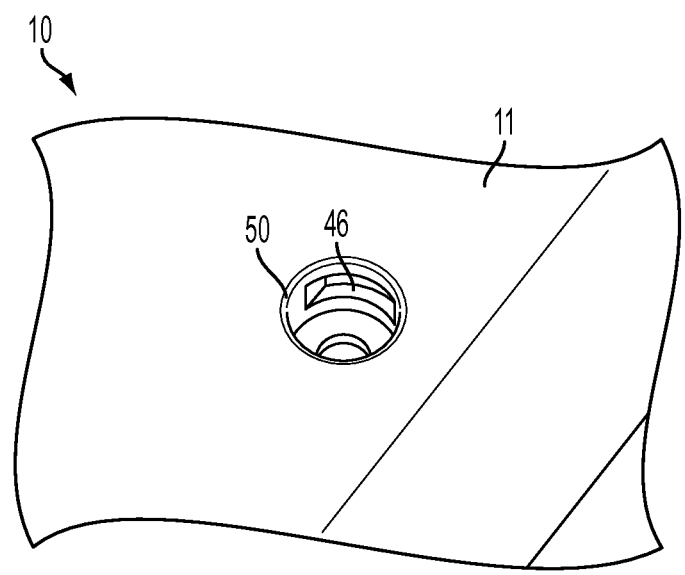
FIG. 4 is a detailed bottom view of a notebook PC illustrating an exit opening on a bottom case according to the exemplary embodiment shown in FIG. 3.

Referring to FIG. 4, in an exemplary embodiment, the drainage system 26 may further include an end opening 50 which may terminate at a plane defined by the bottom case 11 of the notebook PC 10. The collected liquid may flow through the tunnel 43 and may be discharged through the end opening 50 to outside the notebook PC 10.

It should be understood, of course, that the foregoing relate to exemplary embodiments of the invention and that modifications may be made without departing from the spirit and scope of the invention as set forth in the following claims.

I claim:

1. A drainage system for a pushbutton casing, comprising:
    a liquid collecting receptacle operatively interfacing the pushbutton casing;
    a counter-bore having a sidewall; and
    a drainage exit disposed on the sidewall of the counter-bore, wherein an end opening of the counter-bore is in connection with a drainage exit, the end opening of the counter-bore is disposed to allow liquid entering the drainage exit out of the end opening of the counter-bore.

2. The drainage system of claim 1, wherein the liquid collecting receptacle is adapted to receive liquid from an area around pushbuttons.

3. The drainage system of claim 1, wherein the counter-bore is a threaded counter-bore adapted to receive a fastener.

4. The drainage system of claim 1, further comprising a partition member disposed to operably interface an electronic circuit and the liquid collecting receptacle.

5. The drainage system of claim 1, wherein the end opening of the counter-bore terminates at a plane defined by a bottom case.

6. The drainage system of claim 1, wherein the drainage system is situated under a keyboard of a computing system.

7. The drainage system of claim 1, wherein the drainage system is situated under a touchpad of a computing system.

8. The drainage system of claim 1, wherein the drainage system is adapted to be installed in a bottom case of a computing system.

9. An electronic computing apparatus comprising:
    a casing having a plurality of pushbuttons on a surface of the casing; and
    a drainage system, comprising:
        a counter-bore having a sidewall; and
        a drainage exit disposed on the sidewall of the counter-bore.

10. The electronic computing apparatus of claim 9, wherein the counter-bore is a threaded counter-bore adapted to receive a fastener.

11. The electronic computing apparatus of claim 9, further comprising an end opening terminating at a plane defined by the casing.

12. The electronic computing apparatus of claim 9, further comprising a liquid collecting receptacle adapted to receive liquid from an area around the plurality of pushbuttons.

13. The electronic computing apparatus of claim 9, further comprising a partition member disposed to operably interface an electronic circuit and the drainage system.

14. The electronic computing apparatus of claim 9, the drainage system is adapted to be installed in a bottom case of the electronic computing apparatus.

15. The electronic computing apparatus of claim 9, wherein the drainage system is situated under a touchpad of a computing system.

16. A method for draining liquid permeated between a plurality of pushbuttons on a surface of a casing, comprising:
    collecting liquid that has permeated between the pushbuttons on a surface of the casing; and
    directing the collected liquid into a drainage exit;
    wherein the drainage exit is disposed on a sidewall of a counter-bore.

17. The method of claim 16, further comprising preventing the liquid from contacting an electronic circuit within the casing.

18. The method of claim 16, further comprising moving the liquid substantially horizontally to the drainage exit.

19. The method of claim 16, further comprising discharging the collected liquid from drainage exit to an exit opening of the existing counter-bore.

20. The method of claim 16, further comprising providing a liquid collecting receptacle operatively interfacing the casing.

* * * * *